United States Patent [19]

Hiratsuka et al.

[11] Patent Number: 5,715,095
[45] Date of Patent: Feb. 3, 1998

[54] COLOR SEPARATING DEVICE AND COLOR IMAGE READING DEVICE INCORPORATING SAME

[75] Inventors: Seiichiro Hiratsuka, Kitakyushu; Masaya Shimada, Oonojo, both of Japan

[73] Assignee: Matsushita Electric Industrial Co., Ltd., Osaka, Japan

[21] Appl. No.: 391,230

[22] Filed: Feb. 21, 1995

[30] Foreign Application Priority Data

Feb. 22, 1994 [JP] Japan .................. 6-023921

[51] Int. Cl.$^6$ .................................................. G02B 27/14
[52] U.S. Cl. ................... 359/634; 359/637; 359/638
[58] Field of Search .......................... 359/634, 583, 359/637, 638

[56] References Cited

U.S. PATENT DOCUMENTS

| 4,709,144 | 11/1987 | Vincent | 250/226 |
| 4,962,997 | 10/1990 | Baldwin | 359/41 |
| 5,032,004 | 7/1991 | Steinle | 359/637 |
| 5,241,407 | 8/1993 | Sonehara | 359/40 |

FOREIGN PATENT DOCUMENTS

| 0325362 | 7/1989 | European Pat. Off. . | |
| 0325363 | 7/1989 | European Pat. Off. . | |
| 62-234106 | 10/1987 | Japan . | |
| 3-125114 | 5/1991 | Japan | 359/634 |
| 3146918 | 6/1991 | Japan . | |
| 1029078 | 5/1966 | United Kingdom . | |

*Primary Examiner*—David C. Nelms
*Assistant Examiner*—Ricky Mack
*Attorney, Agent, or Firm*—Pollock, Vande Sande & Priddy

[57] ABSTRACT

In a color separating device, three reflection elements each formed by laminating a dichroic mirror and a total reflection mirror via a transparent layer interposed therebetween are used. The three reflection elements have mutually different spectral characteristics and are arranged to separate incident light reflected from a color original into three color lights without causing a difference in optical paths of the respective color lights. Two of the reflection elements may be used in combination with a condenser lens having principal points whose positions differ depending on wavelengths of light, so as to perform the three-color separation in a similar manner.

12 Claims, 7 Drawing Sheets

COLOR SEPARATING DEVICE AND COLOR IMAGE READING DEVICE INCORPORATING SAME

BACKGROUND OF THE INVENTION

1. Field of the Invention

The present invention relates to a color separating device for separating in color a color image, and a color image reading device incorporating such a color separating device for separating the color image into a given number of color images and reading such separated color images.

2. Description of the Prior Art

Color separating devices and color image reading devices incorporating the former have been used in image input devices for computers or the like.

Japanese First (unexamined) Patent Publication No. 62-234106 discloses one type of the color separating devices, wherein two beam splitters or reflection elements each formed by laminating three dichroic films via glass plates interposed therebetween are used for separating a color image into three primary colors with optical paths (optical distances or lengths) of the respective three color lights being equal to each other. On the other hand, Japanese First (unexamined) Patent Publication No. 3-146918 discloses another type, wherein four reflection elements each formed by laminating a dichroic mirror and a total reflection mirror with a transparent layer interposed therebetween are used for separating a color image into three primary colors with optical paths of the respective three color lights being equal to each other.

FIG. 11 shows the color separating device of the former type, wherein two reflection elements each formed by laminating three dichroic mirrors with transparent layers interposed therebetween are used. In FIG. 11, symbols 1R and 2R denote dichroic mirrors, respectively, each of which reflects a red light R, symbols 1G and 2G denote dichroic mirrors, respectively, each of which reflects a green light G, and symbols 1B and 2B denote dichroic mirrors, respectively, each of which reflects a blue light B. Numeral 1 denotes a reflection element having the three dichroic mirrors 1R, 1G and 1B laminated via parallel-sided transparent layers interposed therebetween. Numeral 2 denotes a reflection element having the three dichroic mirrors 2R, 2G anal 2B laminated via parallel-sided transparent layers interposed therebetween. Numeral 3 denotes a CCD image sensor with three line sensors arranged in parallel to each other with given same intervals therebetween.

With this arrangement, the light irradiated onto and reflected from the color image is separated into the three primary color lights such that the red light R is reflected by the dichroic mirrors 1R and 2R, the green light G is reflected by the dichroic mirrors 1G and 2G and the blue light B is reflected by the dichroic mirrors 1B and 2B. The separated three primary color lights are incident upon the CCD image sensor 3 with given same intervals therebetween and with optical paths of the respective lights being equal to each other.

FIG. 12 shows the color separating device of the latter type, wherein four reflection elements each formed by laminating a dichroic mirror and a total reflection mirror via a transparent layer interposed therebetween are used. In FIG. 12, symbol 4M denotes a total reflection mirror, symbol 4R denotes a dichroic mirror which reflects a red light R, and numeral 4 denotes a reflection element having the total reflection mirror 4M and the dichroic mirror 4R laminated via a parallel-sided transparent layer interposed therebetween. Symbol 5M denotes a total reflection mirror, symbol 5RG denotes a dichroic mirror which reflects the red light R and a green light G, and numeral 5 denotes a reflection element having the total reflection mirror 5M and the dichroic mirror 5RG laminated via a parallel-sided transparent layer interposed therebetween. Symbol 6M denotes a total reflection mirror, symbol 6GB denotes a dichroic mirror which reflects the green light G and a blue light B, and numeral 6 denotes a reflection element having the total reflection mirror 6M and the dichroic mirror 6GB laminated via a parallel-sided transparent layer interposed therebetween. Symbol 7M denotes a total reflection mirror, symbol 7B denotes a dichroic mirror which reflects the blue light B, and numeral 7 denotes a reflection element having the total reflection mirror 7M and the dichroic mirror 7B laminated via a parallel-sided transparent layer interposed therebetween. Numeral 8 denotes a CCD image sensor having three line sensors arranged in parallel to each other with given same intervals therebetween.

With this arrangement, the light irradiated onto and reflected from the color image is separated into the three primary color lights such that the red light R is reflected by the dichroic mirrors 4R and 5RG and the total reflection mirrors 6M and 7M, the green light G is reflected by the dichroic mirrors 5RG and 6GB and the total reflection mirrors 4M and 7M, and the blue light B is reflected by the dichroic mirrors 6GB and 7B and the total reflection mirrors 4M and 5M. The separated three primary color lights are incident upon the CCD image sensor 8 with given same intervals therebetween and with optical paths of the respective lights being equal to each other.

In the former color separating device, however, since the three dichroic mirrors are superimposed via the two transparent layers interposed therebetween, the highly-difficult manufacturing technique is required to control a thickness of each transparent layer to 100 μm–500 μm with high accuracy. This increases the manufacturing cost.

On the other hand, in the latter color separating device, the manufacturing of the reflection elements is less difficult and each reflection element is less cost as compared with the former color separating device. However, in the latter device, four kinds of the dichroic mirrors having mutually different spectral reflection characteristics should be produced so that the total cost of the reflection elements becomes higher as compared with the former device. Further, since the light beams of all the colors are incident upon the dichroic mirrors four times in total, the lowering of quantity of light is large due to absorption at the dichroic mirrors. Moreover, since the four reflection elements are used, the arrangement and adjustment thereof are required at corresponding four locations, which renders the working process rather bothersome and increases size of the color separating device.

SUMMARY OF THE INVENTION

Therefore, it is an object of the present invention to provide an improved color separating device.

It is another object of the present invention to provide an improved color image reading device.

According to one aspect of the present invention, a color separating device comprises three reflection elements having mutually different spectral characteristics, each of the three reflection elements having a transmitting/reflecting member for transmitting light having a given wavelength and reflecting light having other than the given wavelength and a reflection mirror for reflecting light,. the transmitting/reflecting member and the reflection mirror being laminated via a transparent layer interposed therebetween to form the reflection element; and the three reflection elements being arranged so as to separate incident light into three color lights whose optical paths are equal to each other.

According to another aspect of the present invention, a color image reading device comprises three reflection elements having mutually different spectral characteristics, each of the three reflection elements having a transmitting/reflecting member for transmitting light having a given wavelength and reflecting light having other than the given wavelength and a reflection mirror for reflecting light, the transmitting/reflecting member and the reflection mirror being laminated via a transparent layer interposed therebetween to form the reflection element; a lens for condensing light; a sensor for converting the light into an electric signal; and the lens and the three reflection elements being arranged so as to separate the light into three color lights whose optical paths are equal to each other, and to converge the three color lights onto the sensor.

According to another aspect of the present invention, a color separating device comprises a plurality of reflection elements having mutually different spectral characteristics, each of the reflection elements having a transmitting/reflecting member for transmitting light having a given wavelength and reflecting light having other than the given wavelength and a reflection mirror for reflecting light, the transmitting/reflecting member and the reflection mirror being laminated via a transparent layer interposed therebetween to form the reflection element; and a lens having principal points whose positions differ depending on wavelengths of light.

According to another aspect of the present invention, a color separating device comprises two reflection elements having mutually different spectral characteristics, each of the reflection elements having a transmitting/reflecting member for transmitting light having a given wavelength and reflecting light having other than the given wavelength and a reflection mirror for reflecting light, the transmitting/reflecting member and the reflection mirror being laminated via a transparent layer interposed therebetween to form the reflection element, the two reflection elements being arranged so as to separate incident light into three color lights; and a lens having principal points whose positions differ depending on wavelengths of light so as to correct a difference in optical paths which is caused between the respective color lights due to the reflection elements.

According to another aspect of the present invention, a color image reading device comprises two reflection elements having mutually different spectral characteristics, each of the reflection elements having a transmitting/reflecting member for transmitting light having a given wavelength and reflecting light having other than the given wavelength and a reflection mirror for reflecting light, the transmitting/reflecting member and the reflection mirror being laminated via a transparent layer interposed therebetween to form the reflection element, the two reflection elements being arranged so as to separate incident light into three color lights; a sensor for converting the respective color lights into corresponding electric signals; and a lens having principal points whose positions differ depending on wavelengths of light so as to correct a difference in optical paths which is caused between the respective color lights due to the reflection elements.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to limit the present invention.

In the drawings.

DESCRIPTION OF THE PREFERRED EMBODIMENT

Now, preferred embodiments of the present invention will be described hereinbelow with reference to the accompanying drawings.

Figure 1:
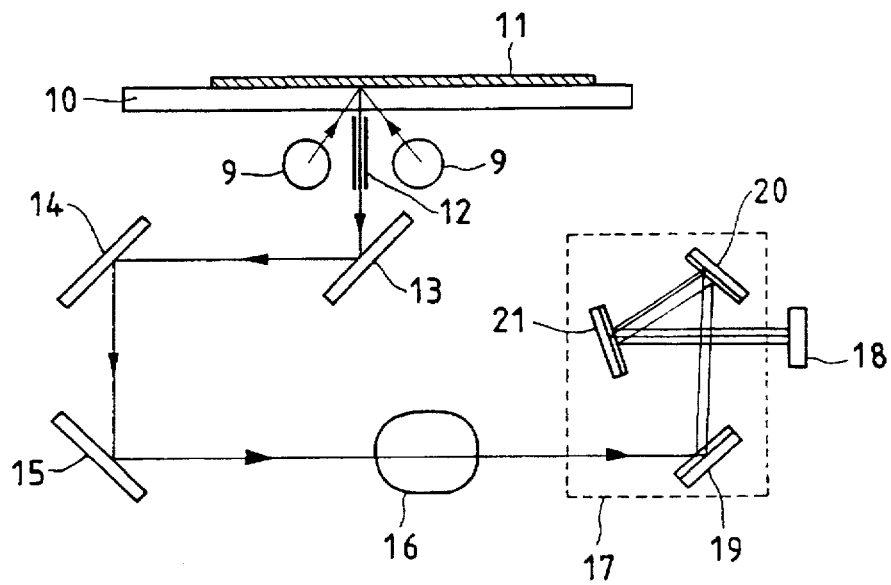
FIG. 1 is a diagram showing a structure of a color image reading device incorporating a color separating device according to a first preferred embodiment of the present invention.

FIG. 1 shows a structure of a color image reading device incorporating a color separating device according to a first preferred embodiment of the present invention. In FIG. 1, numerals 9, 9 denote illumination lamps, respectively, for applying or irradiating light onto a color original 11 on a cover glass 10, and numeral 12 denotes an incident Slit for cutting off those light beams reflected from other than a reading area on the color original 11, that is, for passing only those light beams reflected from the reading area on the color original 11. Numerals 13, 14 and 15 denote total reflection mirrors, respectively, for reflecting the reflected light having passed through the incident slit 12, and numeral 16 denotes an image-forming or condenser lens for condensing the light reflected from the total reflection mirror 15. Numeral 17 denotes a color separating device for separating the light incident thereupon via the condenser lens 16 into three colors. The color separating device 17 includes reflection elements 19, 20 and 21 each formed by laminating a dichroic mirror and a total reflection mirror via a transparent layer interposed therebetween. As is known, the dichroic mirror transmits the light having a given wavelength, while reflects the light having other than the given wavelength. Numeral 18 denotes a CCD image sensor having three line sensors arranged in parallel to each other with given same intervals therebetween. As seen in FIG. 1, the color separating device 17 is arranged in a light traveling path between the condenser lens 16 and the CCD image sensor 18.

A slit width of the incident slit 12 is set such that each of the three color lights is incident up, on the corresponding one of the three line sensors of the CCD image sensor 18 without being incident upon the different line sensor which detects the different color.

Now, an operation of the color separating device 17 according to the first preferred embodiment will be described hereinbelow.

The light of the illumination lamps 9 reflected by the color original on the cover glass 10 is formed into the slit-shaped light via the incident slit 12, and then reflected by the total reflection mirrors 13, 14 and 15 to change its directions. The slit-shaped light is then conducted via the condenser lens 16 to the color separating device 17 where the slit-shaped light is separated into three color lights with no difference in their optical paths (optical distances or lengths). The three color lights are then incident upon the corresponding line sensors of the CCD image sensor 18 to form images thereon and converted into corresponding electric signals.

In the color separating device 17, the light from the condenser lens 16 is first incident upon the reflection element 19 where the light is separated into two color lights and reflected. The separated two color lights are then incident upon the reflection element 20 where the two color lights are separated into three color lights and reflected. Finally, the separated three color lights are incident upon the reflection element 21 where the optical paths of the three color lights are adjusted and reflected.

Figure 2:
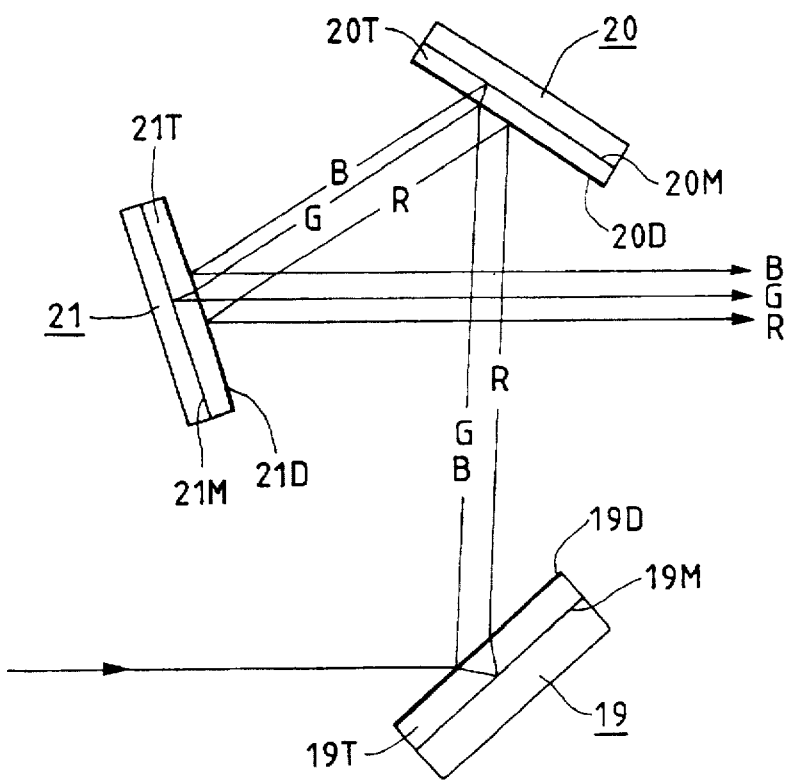
FIG. 2 is a diagram showing a structure of the color separating device according to the first preferred embodiment.

FIG. 2 shows a structure of the color separating device 17. As shown in FIG. 2, the reflection element 19 is constituted by a dichroic mirror 19D, a total reflection mirror 19M and a transparent layer 19T interposed between the dichroic mirror 19D and the total reflection mirror 19M. The dichroic mirror 19D reflects a green light G and a blue light B and transmits a red light R. The reflection element 20 is constituted by a dichroic mirror 20D, a total reflection mirror 20M and a transparent layer 20T interposed between the dichroic mirror 20D and the total reflection mirror 20M. The dichroic mirror 20D reflects the red light R and the green light G and transmits the blue light B. The reflection element 21 is constituted by a dichroic mirror 21D, a total reflection mirror 21M and a transparent layer 21T interposed between the dichroic mirror 21D and the total reflection mirror 21M. The dichroic mirror 21D reflects the red light R and the blue light B and transmits the green light G.

The operation of the color separating device 17 will be described hereinbelow in further detail.

The light from the condenser lens 16 is incident upon the reflection element 19 where the dichroic mirror 19D reflects the green light G and the blue light B while transmitting the red light R. The red light R is then refracted by the transparent layer 19T to reach the total reflection mirror 19M where the red light R is reflected. The reflected red light R is again refracted by the transparent layer 19T and transmitted through the dichroic mirror 19D. Through the reflection element 19, the light is separated into two color lights, one being a mixture of the green light G and the blue light B and the other being the red light R. The two color lights advance toward the reflection element 20 in parallel to each other with a given interval therebetween and with a difference in their optical paths.

At the reflection element 20, the dichroic mirror 20D transmits only the blue light B so that the color separation into the blue light B and the green light G is performed. Further, correction of a difference between the optical paths of the red light R and the blue light B is performed to render their optical paths equal to each other. Moreover, an interval between the red light R and the blue light B is corrected to be twice the interval of the adjacent line sensors of the CCD image sensor 18. On other hand, the optical path of the green light G differs from that of the red light R or the blue light B. Further, either of intervals between the green and red lights G, R and between the green and blue lights G, B does not correspond to the interval between the adjacent line sensors of the CCD image sensor 18.

Finally, at the reflection element 21, the dichroic mirror 21D transmits only the green light G so that correction of a difference between the optical paths of the green light G and the red or blue light R, B is performed to render all of their optical paths equal to each other. Further, the intervals between the green and red lights G, R and between the green and blue lights G, B are corrected to correspond to the intervals between the adjacent line sensors of the CCD image sensor 18. As a result, the red light R, the green light G and the blue light B are incident upon the corresponding line sensors of the CCD image sensor 18 with no difference in their optical paths and with the intervals therebetween corresponding to the intervals between the adjacent line sensors of the CCD image sensor 18.

Now, a design method of the color separating device 17 will be described hereinbelow.

First, before designing the color separating device 17, calculation methods for deriving differences of the optical paths of the red, green and blue lights at the reflection elements 19, 20 and 21 and thicknesses of the transparent layers 19T, 20T and 21T will be described hereinbelow.

Figure 3:
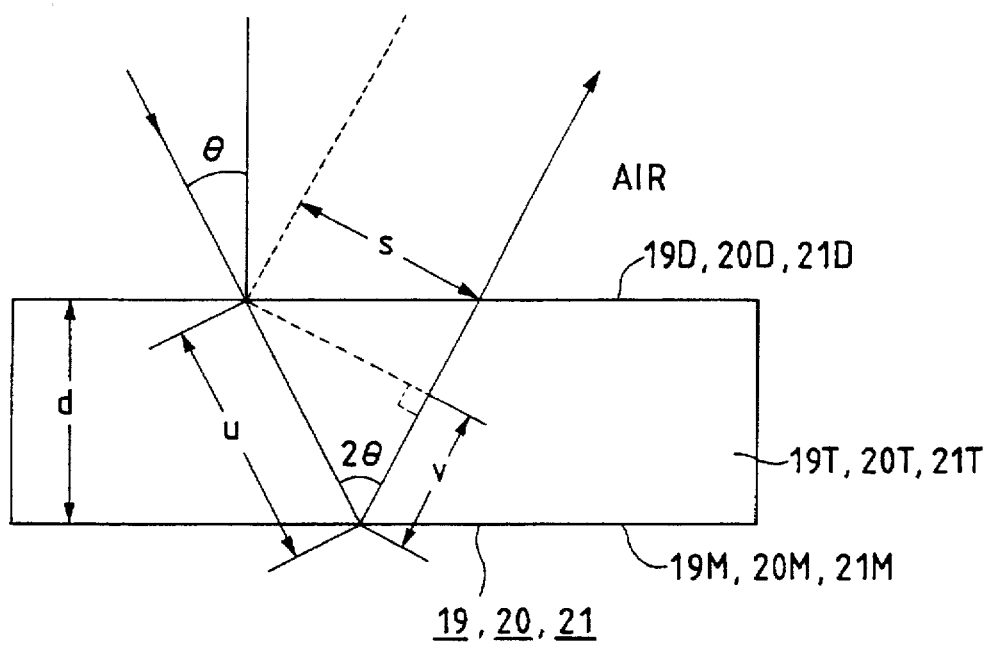
FIG. 3 is a diagram for explaining a calculation method of deriving differences of the optical paths of the respective color lights at the reflection elements in the color separating device according to the first preferred embodiment, wherein it is assumed that the transparent layers are made of air like incident-side regions of the reflection elements.

FIG. 3 is a diagram for explaining the calculation method of deriving the differences of the optical paths of the respective color lights at the reflection elements 19, 20 and 21 in the color separating device 17, wherein it is assumed that the transparent layers 19T, 20T and 21T are made of air like incident-side regions of the reflection elements 19, 20 and 21. In FIG. 3, d represents a thickness of the transparent (air) layer 19T, 20T, 21T, $\theta$ represents an incident angle of the light relative to the reflection element 19, 20, 21, s represents a lateral shift of the light due to the reflection element 19, 20, 21, u represents a difference in optical path at an incident side of the light, and v represents a difference in optical path at an outgoing side of the light.

First, the incident-side difference u and the outgoing-side difference v are given by:

$$u = s/\sin 2\theta \quad (1)$$

$$v = s/\tan 2\theta \quad (2)$$

Accordingly, a total optical path difference L is given by:

$$L = u + v = ((1/\sin 2\theta) + (1/\tan 2\theta))s \quad (3)$$

If an optical path difference coefficient p which depends on an incident angle of the light is given by:

$$p = (1/\sin 2\theta) + (1/\tan 2\theta) \quad (4)$$

the total optical path difference L is given by:

$$L = ps \quad (5)$$

On the other hand, the thickness d of the transparent (air) layer 19T, 20T, 21T is given by:

$$d = u \cos \theta = s/(2 \sin \theta) \quad (6)$$

Accordingly, the total optical path difference L at the reflection element 19, 20, 21 and the thickness d of the transparent (air) layer 19T, 20T, 21T for the light incident angle θ and the light lateral shift s are derived, respectively.

Figure 4:
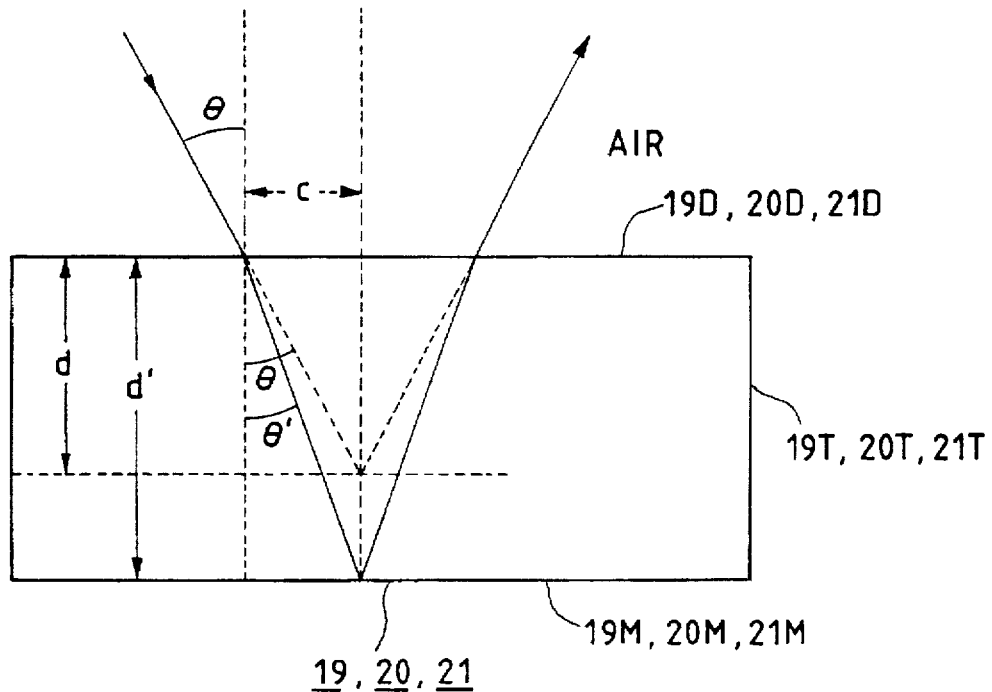
FIG. 4 is a diagram for explaining a calculation method of deriving thicknesses of the transparent layers of the reflection elements in the color separating device according to the first preferred embodiment, wherein the transparent layers are made of glass.

Now, it is considered that the transparent layers 19T, 20T and 21T are made of glass having a refraction factor n. In FIG. 4, d' represents a thickness of the transparent (glass) layer 19T, 20T, 21T, θ represents an incident angle of the light relative to the reflection element 19, 20, 21, θ' represents an outgoing angle of the light relative to the transparent (glass) layer 19T, 20T, 21T, d represents a thickness of the transparent layer 19T, 20T, 21T when it is assumed to be made of air, and c represents a horizontal component of an incident optical path at the transparent (glass) layer 19T, 20T, 21T.

First, according to the law of refraction, the refraction factor n is given by:

$$n = \sin \theta / \sin \theta' \quad (7)$$

If equation (7) is solved for the outgoing angle θ':

$$\theta' = \sin^{-1}(\sin \theta / n) \quad (8)$$

On the other hand, the horizontal component c is constant irrespective of whether the transparent layer 19T, 20T, 21T is made of air or glass. Accordingly:

$$c = d \tan \theta = d' \tan \theta' \quad (9)$$

If equation (9) is solved for the thickness d':

$$d' = (\tan \theta / \tan \theta')d \quad (10)$$

Accordingly, by substituting equations (6) and (8) into equation (10), the thickness d' of the transparent (glass) layer 19T, 20T, 21T is derived for the light incident angle θ, the light lateral shift s and the refraction factor n.

Now, the design method of the color separating device 17 (that is, a method of setting incident angles of the light relative to the reflection elements 19, 20 and 21) will be described using the foregoing equations.

Figure 5:
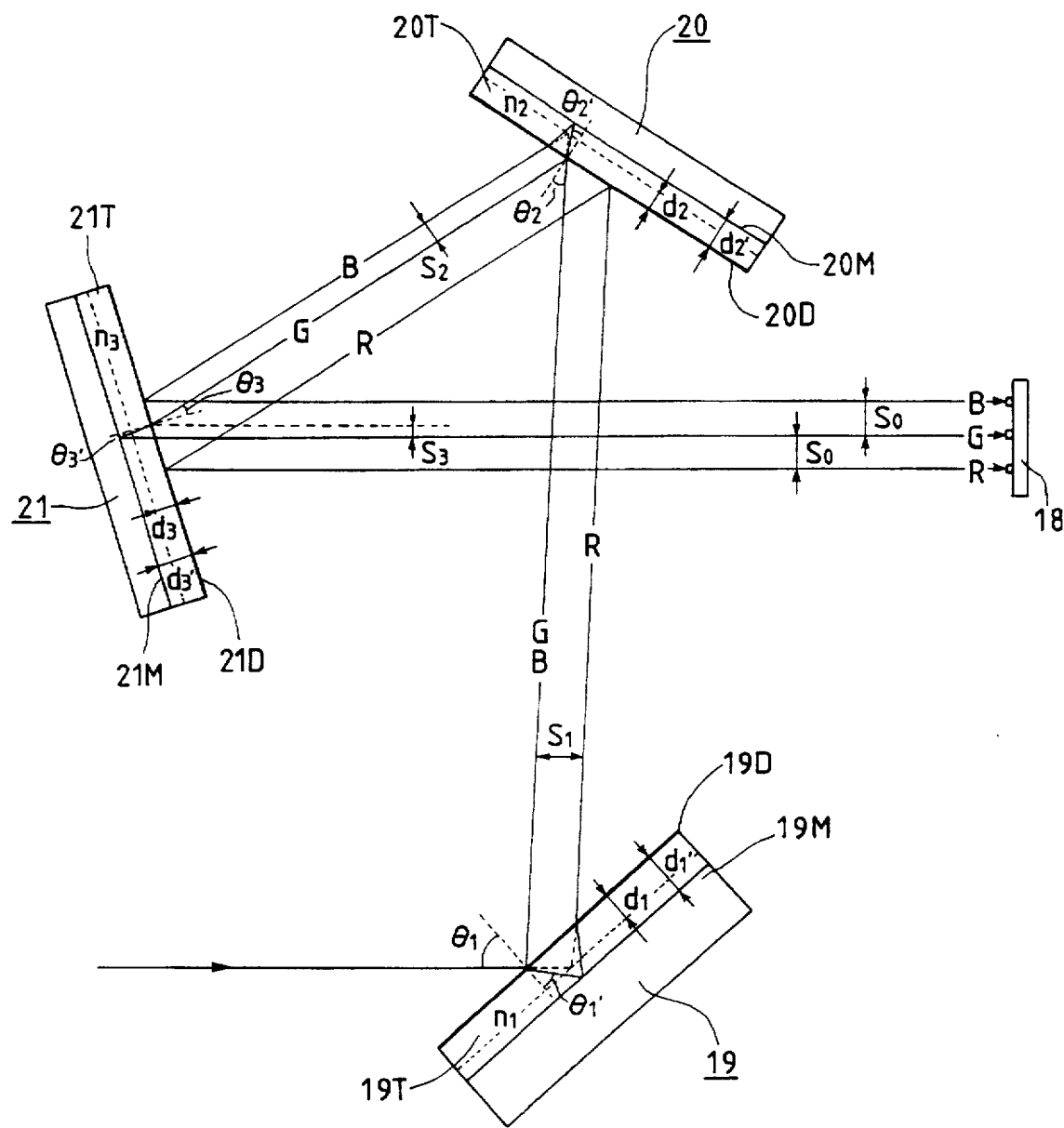
FIG. 5 a is a diagram for explaining a design method of the color separating device according to the first preferred embodiment.

FIG. 5 is a diagram for explaining the design method of the color separating device 17. In FIG. 5, θ1, θ2 and θ3 represent incident angles of the light relative to the reflection elements 19, 20 and 21, θ1', θ2' and θ3' represent outgoing angles of the light relative to the transparent (glass) layers 19T, 20T and 21T, n1, n2 and n3 represent refraction factors of the transparent (glass) layers 19T, 20T and 21T, and s1, s2 and s3 represent lateral shifts of the light due to the reflection elements 19, 20 and 21. Further, s0 represents the interval between the adjacent line sensors of the CCD image sensor 18.

First, from equation (4), optical path difference coefficients p1, p2 and p3 of the reflection elements 19, 20 and 21 are given by:

$$p1 = (1/\sin 2\theta 1) + (1/\tan 2\theta 1) \quad (11)$$

$$p2 = (1/\sin 2\theta 2) + (1/\tan 2\theta 2) \quad (12)$$

$$p3 = (1/\sin 2\theta 3) + (1/\tan 2\theta 3) \quad (13)$$

On the other hand, from equation (5), total optical path differences L1, L2 and L3 of the reflection elements 19, 20 and 21 are given by:

$$L1 = p1 \, s1 \quad (14)$$

$$L2 = p2 \, s2 \quad (15)$$

$$L3 = p3 \, s3 \quad (16)$$

Since the total optical path differences L1, L2 and L3 should be equal to each other:

$$p1 \, s1 = p2 \, s2 = p3 \, s3 \quad (17)$$

Further, as clear from FIG. 5, the relationship between the light lateral shifts s1, s2 and s3 and the line sensor interval s0 of the CCD image sensor 18 is given by:

$$s1 + s2 = 2s0 \quad (18)$$

$$s2 + s3 = s0 \quad (19)$$

From equations (17) and (18), the light lateral shifts s1 and s2 are given by:

$$s1 = 2\{p2/(p1+p2)\}s0 \quad (20)$$

$$s2 = 2\{p1/(p1+p2)\}s0 \quad (21)$$

Similarly, from equations (17) and (19), the light lateral shifts s2 and s3 are given by:

$$s2 = 2\{p3/(p2+p3)\}s0 \quad (22)$$

$$s3 = 2\{p2/(p2+p3)\}s0 \quad (23)$$

Accordingly, from equations (21) and (22):

$$2 \, p1 \, p2 + p1 \, p3 - p2 \, p3 = 0 \quad (24)$$

On the other hand, in this preferred embodiment, the light is inputted into and outputted from the color separating device 17 horizontally. Accordingly, the sum of the light incident angles θ1, θ2 and θ3 are given by:

$$\theta 1+\theta 2+\theta 3=90° \quad (25)$$

As appreciated, if it is tried to obtain the light incident angles θ1, θ2 and θ3 from equation (24) (including equations (11), (12) and (13) which define the optical path difference coefficients p1, p2 and p3 using the light incident angles θ1, θ2 and θ3) and equation (25), since the number of conditional equations is two relative to three unknown values θ1, θ2 and θ3, solution can not be obtained univocally. Further, even if the light incident angle $\theta_1$ is determined, the light incident angles $\theta_2$ and $\theta_3$ can not be obtained analytically due to non-linear equation including trigonometric functions.

In this regard, if numerical calculus is performed with a calculator in consideration of the light incident angles θ1, θ2 and θ3 all being positive values, a range of solution of the light incident angle $\theta_1$ is 45°<θ1<55°. In view of the structure of the color separating device 17 according to this preferred embodiment, it is preferable to realize 46°≦θ1≦53°. Table 1 shows examples of solutions of the light incident angles θ1, θ2 and θ3.

TABLE 1

|    | solution 1 | solution 2 | solution 3 |
|----|-----------|-----------|-----------|
| θ1 | 46.00°    | 47.00°    | 48.00°    |
| θ2 | 33.23°    | 27.69°    | 23.13°    |
| θ3 | 10.77°    | 15.31°    | 18.87°    |

Subsequently, thicknesses d1, d2 and d3 of the transparent (air) layers 19T, 20T and 21T of the reflection elements 19, 20 and are obtained. From equation (6), the thicknesses d1, d2 and d3 are given by:

$$d1=s1/(2 \sin \theta 1) \quad (26)$$

$$d2=s2/(2 \sin \theta 2) \quad (27)$$

$$d3=s3/(2 \sin \theta 3) \quad (28)$$

Finally, thicknesses d1', d2' and d3' of the transparent (glass) layers 19T, 20T and 21T of the reflection elements 19, 20 and 21 are obtained. First, from equation (8), the light outgoing angles θ1', θ2' and θ3' relative to the transparent (glass) layers 19T, 20T and 21T are given by:

$$\theta 1'=\sin^{-1}(\sin \theta 1/n) \quad (29)$$

$$\theta 2'=\sin^{-1}(\sin \theta 2/n) \quad (30)$$

$$\theta 3'=\sin^{-1}(\sin \theta 3/n) \quad (31)$$

On the other hand, from equation (10), the thicknesses d1', d2' and d3' of the transparent (glass) layers 19T, 20T and 21T are given by:

$$d1'=(\tan \theta 1/\tan \theta 1')d1 \quad (32)$$

$$d2'=(\tan \theta 2/\tan \theta 2')d2 \quad (33)$$

$$d3'=(\tan \theta 3/\tan \theta 3')d3 \quad (34)$$

Accordingly, the thicknesses d1', d2' and d3' of the transparent (glass) layers 19T, 20T and 21T are obtained from equations (26) to (34).

For example, if the line sensor interval s0 of the CCD image sensor 18 is 168 μm, the refraction factor n of each of the transparent (glass) layers 19T, 20T and 21T is 1.56, and the light incident angles θ1, θ2 and θ3 are those of solution 1 in Table 1, that is, θ1=46.00°, θ2=33.23°, θ3=10.77°, the thicknesses d1', d2' and d3' of the transparent (glass) layers 19T, 20T and 21T are obtained as d1'=285 μm, θ2'=207.4 μm and d3'=159.5 μm.

In the foregoing manner, the light incident angles θ1, θ2 and θ3 relative to the reflection elements 19, 20 and 21 and the thicknesses d1', d2' and d3' of the transparent (glass) layers 19T, 20T and 21T are determined so that the color separating device 17 can be constituted.

Figure 6:
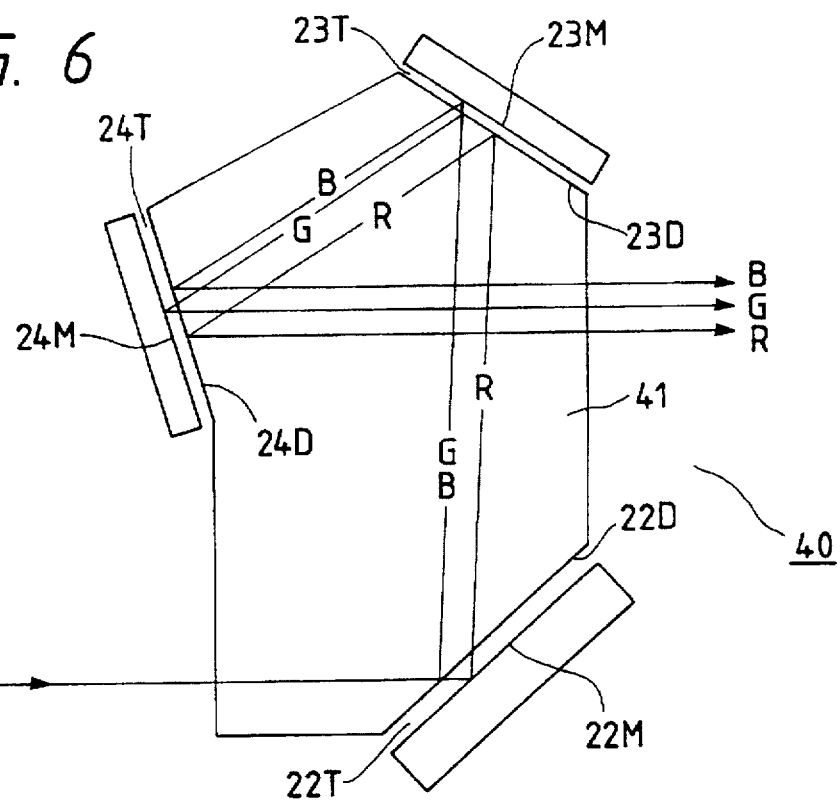
FIG. 6 is a diagram showing a modification of the first preferred embodiment, wherein a color separating device utilizes a glass prism.

FIG. 6 shows a modification of the foregoing first preferred embodiment, wherein the color separating device 17 is replaced by a color separating device 40 using a glass prism 41. As shown in FIG. 6, a dichroic mirror 22D transmitting only the red light R, a dichroic mirror 23D transmitting only the blue light B and a dichroic mirror 24D transmitting only the green light G are deposited on corresponding cut surfaces of the prism 41. Further, total reflection mirrors 22M, 23M and 24M are disposed close to the corresponding dichroic mirrors 22D, 23D and 24D via transparent layers 22T, 23T and 24T in the form of air gaps therebetween, respectively. With this arrangement, the three-color separation can be achieved without generating the optical path difference as in the foregoing first preferred embodiment.

Further, although the spectral characteristics of the dichroic mirrors 19D, 20D and 21D used in the color separating device 17 shown in FIGS. 1 and 2 and the dichroic mirrors 22D, 23D and 24D used in the color separating device 40 shown in FIG. 6 are arranged to transmit the red light R, the blue light B and the green light G in the order named, this order may be changed.

Figure 7:
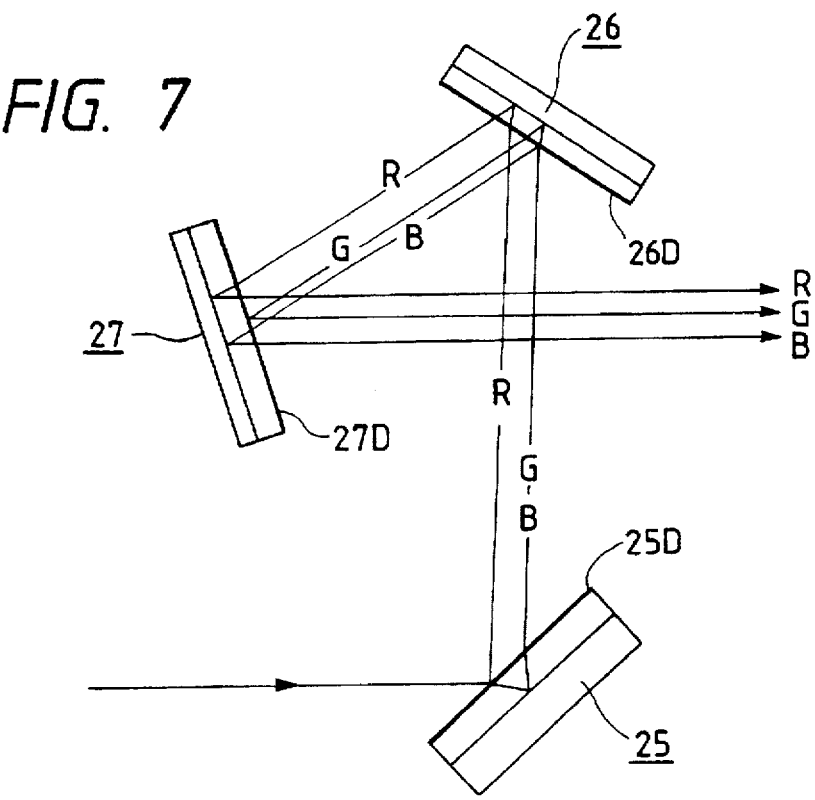
FIG. 7 is a diagram showing another modification of the first preferred embodiment, wherein spectral characteristics of dichroic mirrors of reflection elements are set different from those in the first preferred embodiment.

FIG. 7 shows another modification of the foregoing first preferred embodiment, wherein spectral characteristics of dichroic mirrors 25D, 26D and 27D of reflection elements 25, 26 and 27 are arranged to reflect the red light R, the blue light B and the green light G in the order named. This order may also be changed.

Figure 8:
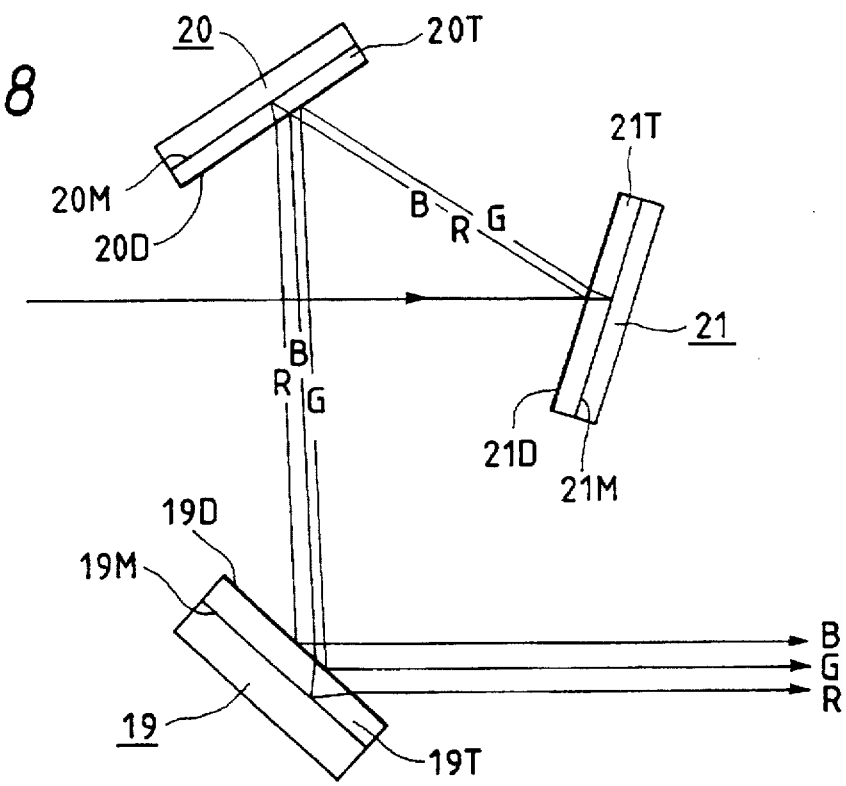
FIG. 8 is a diagram showing another modification of the first preferred embodiment, wherein the order of the reflection elements is reversed as compared with that in the first preferred embodiment.

In the color separating device 17 shown in FIG. 1, the reflection elements 19, 20 and 21 reflect the light in turn in the order named to perform the three-color separation. However, as shown in FIG. 8, this order may be reversed so that the reflection elements 21, 20 and 19 reflect the light in turn in the order named to perform the three-color separation. In this case, if lateral shifts of the light due to the reflection elements 21, 20 and 19 are set as s1', s2' and s3', the relationship of the light lateral shifts s1', s2' and s3' relative to the line sensor interval s0 of the CCD image sensor 18 is given by:

$$s1'+s2'=s0 \quad (35)$$

$$s2'+s3'=2s0 \quad (36)$$

Accordingly, the reflection elements 21, 20 and 19 can be designed in the same manner as the color separating device 17 shown in FIGS. 1 to 5.

Figure 9:
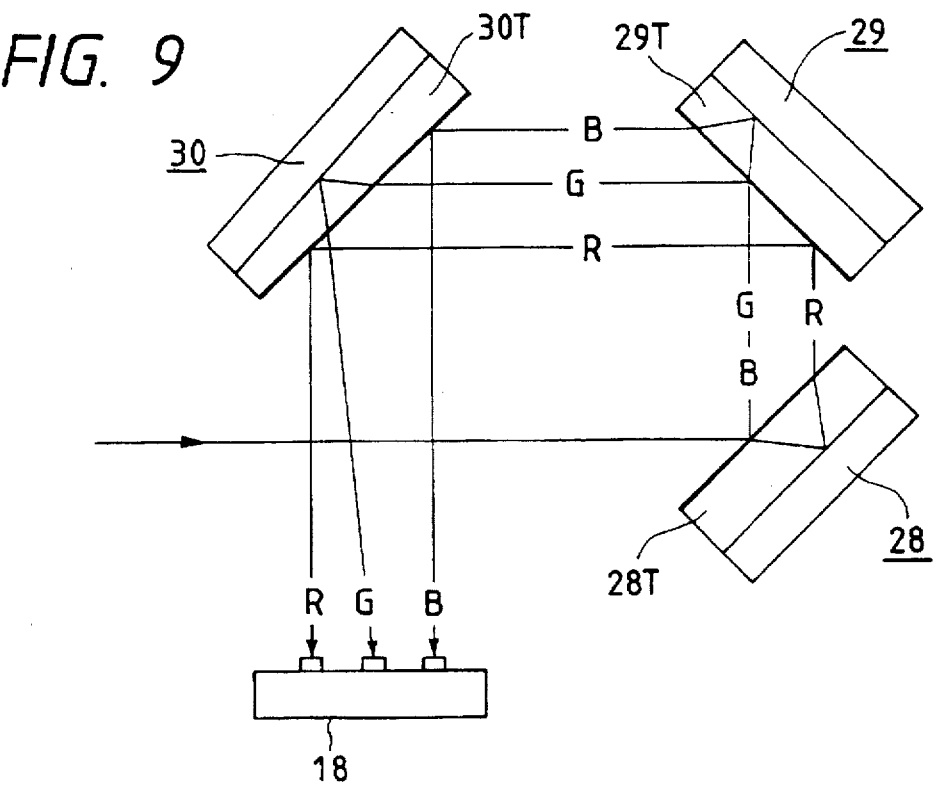
FIG. 9 is a diagram showing another modification of the first preferred embodiment, wherein one of the transparent layers of the reflection elements is wedge-shaped.

Further, although each of the transparent layers 19T, 20T and 21T of the reflection elements 19, 20 and 21 used in the color separating device 17 is parallel-sided, that is, two opposite sides thereof are parallel planar surfaces, one of them may be wedge-shaped. For example, as shown in FIG. 9, among transparent layers 28T, 29T and 30T of reflection elements 28, 29 and 30, the transparent layer 30T may be wedge-shaped. Further, among the transparent layers 19T, 20T and 21T, two of them or all of them may be wedge-shaped. By wedge-shaping at least one of the transparent layers 19T, 20T and 21T, the degree of freedom of the light incident angle relative to the reflection elements 19, 20 and 21 can be increased.

Figure 10:
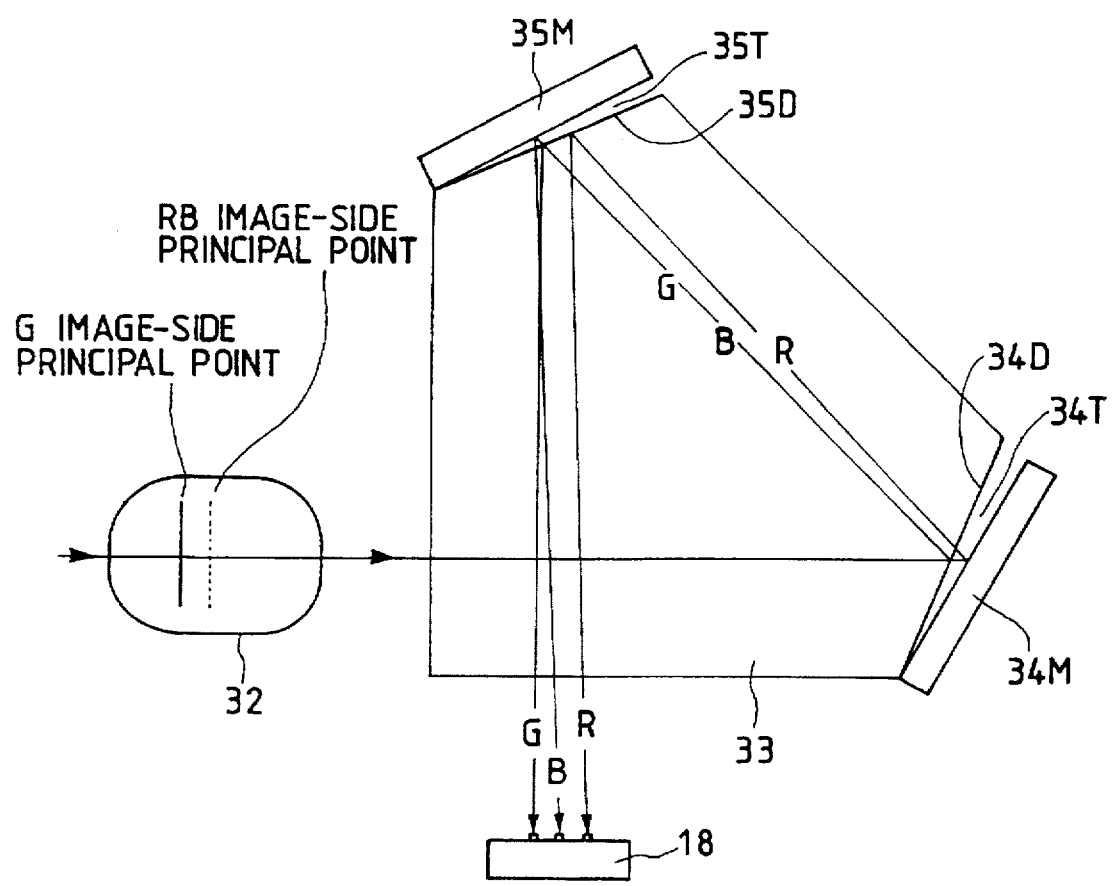
FIG. 10 is a diagram showing a structure of a color separating device according to a second preferred embodiment of the present invention.
Figure 11:
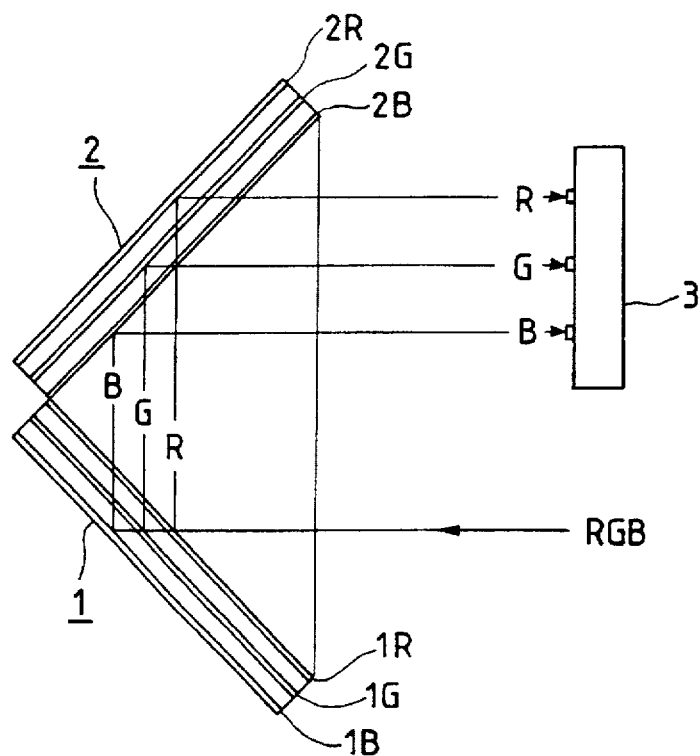
FIG. 11 is a diagram showing a structure of a conventional color separating device, wherein two reflection elements each having three dichroic mirrors laminated via parallel-sided transparent layers interposed therebetween are used.
Figure 12:
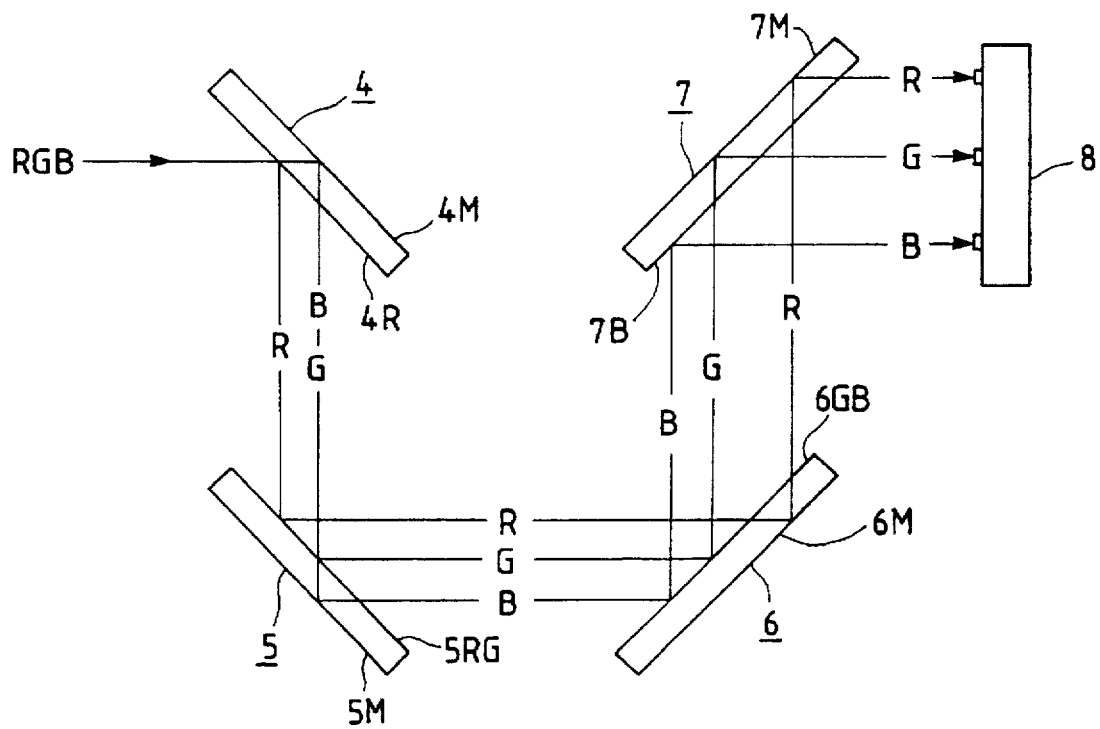
FIG. 12 is a diagram showing a structure of another conventional color separating device, wherein four reflection elements each having a dichroic mirror and a total reflection mirror laminated via a parallel-sided transparent layer interposed therebetween are used.

Now, a second preferred embodiment of the present invention will be described hereinbelow. FIG. 10 shows a structure of a color separating device according to the second preferred embodiment. In the second preferred embodiment, two reflection elements are used in combination with an image-forming or condenser lens to perform the three-color separation with no difference in optical path.

In FIG. 10, numeral 32 denotes a condenser lens which is designed such that an image-side principal point of the green light G is located closer to a light incident side of the condenser lens 32 as compared with an image-side principal point of the red and blue lights R, B. Numeral 33 denotes a color separating prism with dichroic mirrors 34D and 35D deposited on corresponding two cut surfaces thereof. The dichroic mirror 34D has a spectral characteristic to transmit only the red light R, and the dichroic mirror 35D has a spectral characteristic to transmit only the blue light B. Symbols 34T and 35T respectively denote wedge-shaped transparent layers in the form of air gaps, and symbols 34M and 35M respectively denote total reflection mirrors.

Now, an operation of the color separating device according to the second preferred embodiment will be described hereinbelow.

First, the light incident upon the condenser lens 32 passes the prism 33 to be incident upon the dichroic mirror 34D. The dichroic mirror 34D reflects the green light G and the blue light B, while transmitting the red light R which is then refracted by the transparent layer 34T to reach the total reflection mirror 34M where the red light R is reflected. The reflected red light R is again refracted by the transparent layer 34T and transmitted through the dichroic mirror 34D. In this manner, the incident light is separated into two color lights, one being a mixture of the green light G and the blue light B and the other being the red light R.

Subsequently, the dichroic mirror 35D transmits only the blue light B so that the color separation into the blue light B and the green light G is performed. Further, correction of a difference between the optical paths of the red light R and the blue light B is performed to render their optical paths equal to each other. On the other hand, the optical path of the green light G is shorter than that of the red light R or the blue light B. However, since the image-side principal point of the green light G in the condenser lens 32 is arranged to be closer to the light incident side as compared with that of the red and blue light R, B, the optical paths of the red, green and blue lights R, G, B from the image-side principal points thereof in the condenser lens 32 are equal to each other.

It is preferable to use the color separating device of the first preferred embodiment when the line sensor interval of the CCD image sensor is relatively large and to use the color separating device of the second preferred embodiment when the interval is relatively small.

In the foregoing first and second preferred embodiments, the color separating device is arranged at an image side of the condenser lens. On the other hand, the color separating device may be arranged at an original side of the condenser lens, that is, at a side of the color original. Further, the reflection elements of the color separating device may be partly provided at the original and image sides of the condenser lens, respectively.

As described above, according to the foregoing first and second preferred embodiments and the modifications thereof, the required three-color separation can be successfully achieved with the reduced number of the reflection elements. Accordingly, the lowering of quantity of light can be suppressed, and further, the size-reduction and cost-reduction of the device can be realized.

It is to be understood that this invention is not to be limited to the preferred embodiments and modifications described above, and that various changes and modifications may be made without departing from the spirit and scope of the invention as defined in the appended claims.

What is claimed is:

1. A color image reading device comprising:

three reflection elements having mutually different spectral characteristics, each of said three reflection elements having a transmitting/reflecting member for transmitting light having a given wavelength and reflecting light having other than said given wavelength and a reflection mirror for reflecting light, said transmitting/reflecting member and said reflection mirror being separated by transparent layer interposed therebetween to form said reflection element;

a lens for condensing light;

an image sensor having three line sensors arranged in parallel to each other for converting the light into an electric signal; and said three reflection elements are arranged in a light traveling path between said lens and said image sensor and wherein, assuming that an interval between the adjacent line sensors is s0 and lateral shifts of the light separated in color at said reflection elements in turn are s1, s2 and s3 in order of incidence of the light upon said reflection elements, a relationship among s0, s1, s2 and s3 is given by $$s1+s2=2s0$$

$$s2+s3=s0$$

so as to separate the light into three color lights whose optical paths are equal to each other, and to converge the three color lights onto said sensor.

2. The color image reading device as set forth in claim 1, wherein, assuming that incident angles of the light relative to said reflection elements are θ1, θ2 and θ3 in order of incidence of the light upon said reflection elements, a relationship among θ1, θ2 and θ3 is given by $$2\,p1\ p2+p1\ p3-p2\ p3=0$$

wherein $$p1=(1/\sin 2\theta1)+(1/\tan 2\theta1)$$

$$p2=(1/\sin 2\theta2)+(1/\tan 2\theta2)$$

$$p3=(1/\sin 2\theta3)+(1/\tan 2\theta3)$$

$$\theta1+\theta2+\theta3=90°.$$

3. The color image reading device as set forth in claim 2, wherein, assuming that thicknesses of the transparent layers of said reflection elements are d1', d2' and d3' in order of incidence of the light upon said reflection elements and a refraction factor of each of said transparent layers is n, d1', d2' and d3' are given by $$d1'=(\tan\theta1/\tan\theta1)d1$$

wherein $\theta1' = \sin^{-1}(\sin \theta1/n)$ $d1' = s1/(2 \sin \theta1)$ $d2' = (\tan \theta2/\tan \theta2')d2$ wherein $\theta2' = \sin^{-1}(\sin \theta2/n)$ $d2 = s2/(2 \sin \theta2)$ $d3' = (\tan \theta3/\tan \theta3')d3$ wherein $\theta3' = \sin^{-1}(\sin \theta3/n)$ $d3 = s3/(2 \sin \theta3)$.

4. A color separating device comprising:

a plurality of reflection elements having mutually different spectral characteristics, each of said reflection elements having a transmitting/reflecting member for transmitting light having a given wavelength and reflecting light having other than said given wavelength and a reflection mirror for reflecting light, said transmitting/reflecting member and said reflection mirror being separated by a transparent layer interposed therebetween to form said reflection element; and a lens having principal points whose positions differ depending on wavelengths of light, wherein said reflection elements including said transparent layer together with said lens equalizes optical paths for a plurality of given wavelengths of light.

5. The color separating device as set forth in claim 4, wherein each of said transmitting/reflecting members is a dichroic mirror.

6. The color separating device as set forth in claim 4, wherein at least one of said transparent layers is wedge-shaped.

7. The color separating device as set forth in claim 4, wherein each of said transparent layers is an air gap.

8. A color separating device comprising:

two reflection elements having mutually different spectral characteristics, each of said reflection elements having a transmitting/reflecting member for transmitting light having a given wavelength and reflecting light having other than said given wavelength and a reflection mirror for reflecting light, said transmitting/reflecting member and said reflection mirror being separated by a transparent layer interposed therebetween to form said reflection element, said two reflection elements being arranged so as to separate incident light into three color lights: and a lens having principal points whose positions differ depending on wavelengths of light so as to correct a difference in optical paths which is caused between said respective color lights due to said reflection elements.

9. The color separating device as set forth in claim 8, wherein each of said transmitting/reflecting members is a dichroic mirror.

10. A color image reading device comprising:

two reflection elements having mutually different spectral characteristics, each of said reflection elements having a transmitting/reflecting member for transmitting light having a given wavelength and reflecting light having other than said given wavelength and a reflection mirror for reflecting light, said transmitting/reflecting member and said reflection mirror being separated by a transparent layer: interposed therebetween to form said reflection element, said two reflection elements being arranged so as to separate incident light into three color lights;

a sensor for converting said respective color lights into corresponding electric signals; and a lens having principal points whose positions differ depending on wavelengths of light so as to correct a difference in optical paths which is caused between said respective color lights due to said reflection elements.

11. The color image reading device as set forth in claim 10, wherein said sensor is an image sensor having three line sensors arranged in parallel to each other.

12. A color image reading device comprising:

three reflection elements having mutually different spectral characteristics, each of said three reflection elements having a transmitting/reflecting member for transmitting light having a given wavelength and reflecting light having other than said given wavelength and a reflection mirror for reflecting light, said transmitting/reflecting member and said reflection mirror being separated by transparent layer interposed therebetween to form said reflection element;

a lens for condensing light;

an image sensor having three line sensors arranged in parallel to each other for converting the light into an electric signal; and wherein said three reflection elements are arranged in a light traveling path between said lens and said image sensor, and wherein, assuming that an interval between the adjacent line sensors is s0 and lateral shifts of the light separated in color at said reflection elements in turn are s1, s2 and s3 in order of incidence of the light upon said reflection elements, a relationship among s0, s1, s2 and s3 is given by $$s1+s2=s0$$

$$s2+s3=2s0$$

so as to separate the light into three color lights whose optical paths are equal to each other, and to converge the three color lights onto said sensor.

* * * * *